United States Patent
Specht

(10) Patent No.: US 6,502,690 B1
(45) Date of Patent: Jan. 7, 2003

(54) DRIVING ROLL

(75) Inventor: Dieter Specht, Arcegno (CH)

(73) Assignee: Interroll Holding AG, San Antonino (CH)

( * ) Notice: Subject to any disclaimer, the term of this patent is extended or adjusted under 35 U.S.C. 154(b) by 0 days.

(21) Appl. No.: 09/673,536

(22) PCT Filed: Apr. 15, 1999

(86) PCT No.: PCT/EP99/02542

§ 371 (c)(1),
(2), (4) Date: Oct. 17, 2000

(87) PCT Pub. No.: WO99/54241

PCT Pub. Date: Oct. 28, 1999

(30) Foreign Application Priority Data

Apr. 17, 1998 (DE) .......................................... 198 17 126

(51) Int. Cl.⁷ ............................................... B65G 13/06
(52) U.S. Cl. ............ 198/789; 198/781.07; 198/781.11; 198/791
(58) Field of Search ................ 198/789, 791, 198/781.07, 781.11; 492/15, 16

(56) References Cited

U.S. PATENT DOCUMENTS

| 3,803,682 A | 4/1974 | Stein | 198/791 |
|---|---|---|---|
| 4,221,288 A * | 9/1980 | Rae | 198/789 X |
| 4,416,650 A * | 11/1983 | Wilkins | 198/789 X |
| 5,848,958 A * | 12/1998 | Damkjaer | 492/15 X |

FOREIGN PATENT DOCUMENTS

| DE | PS 819 063 | 10/1951 | |
|---|---|---|---|
| DE | AS1198733 | 8/1965 | |
| DE | 2 205 243 | 2/1972 | |
| DE | 73 25 970 | 2/1974 | |
| DE | 2738449 | 8/1977 | |
| DE | 3616840 A1 | 11/1987 | |
| DE | 36 16 840 | 11/1987 | |
| DE | 3842905 C1 | 6/1990 | |
| DE | 3933412 C2 | 5/1992 | |
| DE | 40 40 844 | 7/1992 | |
| DE | 4234096 A1 | 4/1993 | |
| DE | 19532438 A1 | 3/1997 | |
| DE | 19614936 A1 | 10/1997 | |
| EP | 527345 * | 2/1993 | ............ 198/781.07 |

* cited by examiner

Primary Examiner—James R. Bidwell
(74) Attorney, Agent, or Firm—Coats & Bennett, P.L.L.C.

(57) ABSTRACT

The invention pertains to a driving roll for a roller way or conveyor belt in which at least one roller base (102) is provided with a universal coupling device (106, 114), modular drive wheels (104) corresponding to the coupling device (106, 114) are formed and a variable number of drive wheels (104) can mesh with the coupling device (106, 114) (FIG. 1).

21 Claims, 12 Drawing Sheets

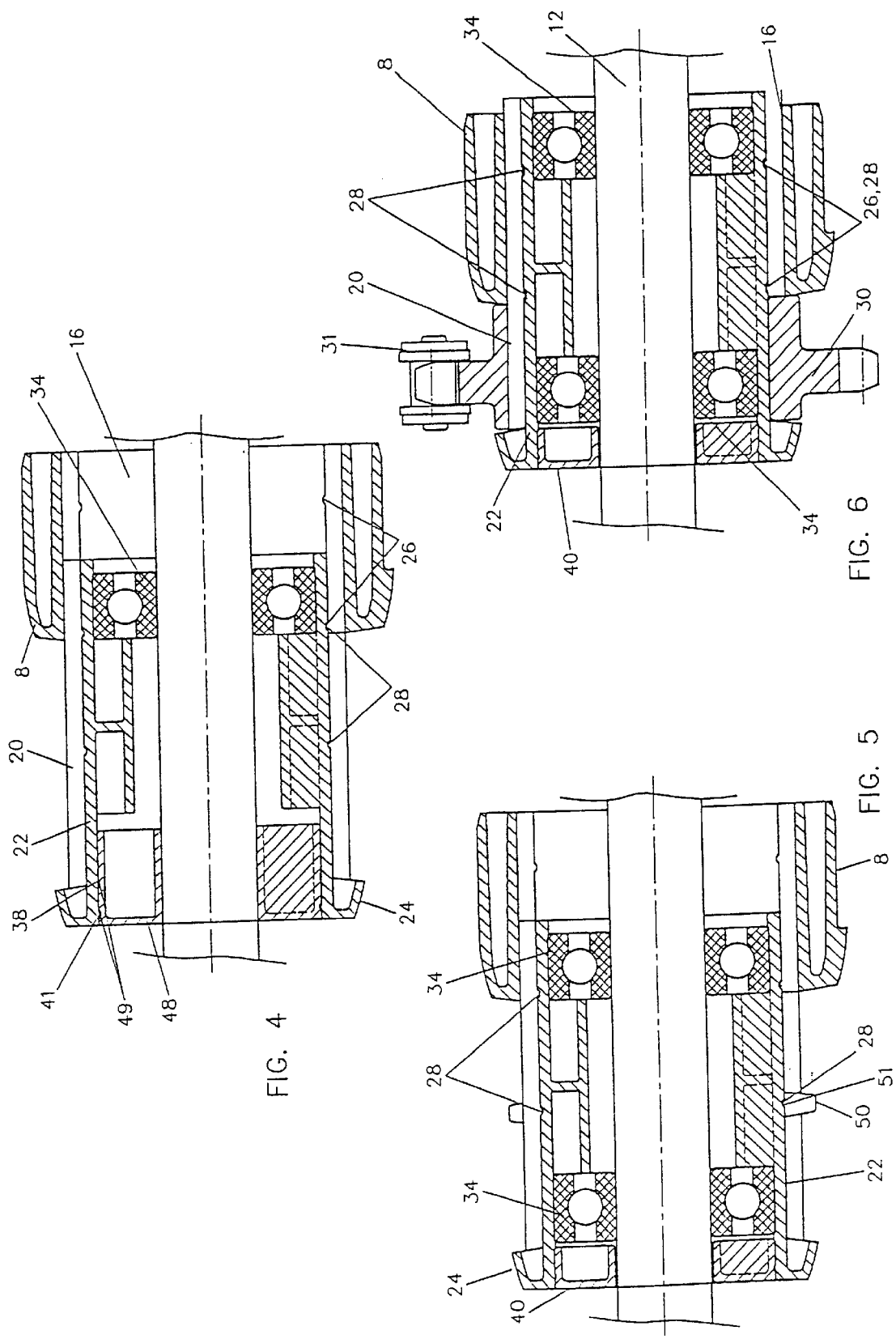

Figure 1:
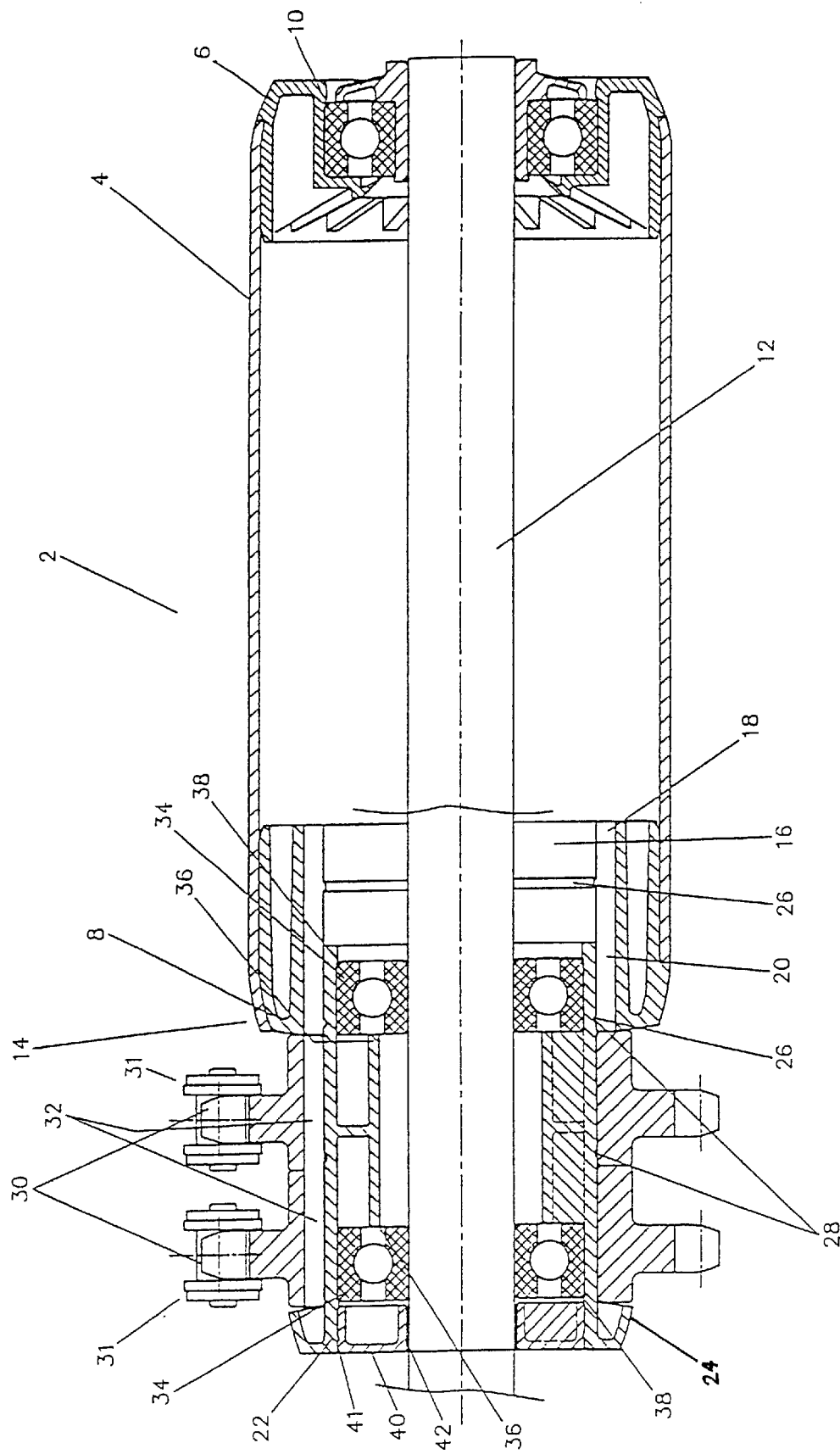

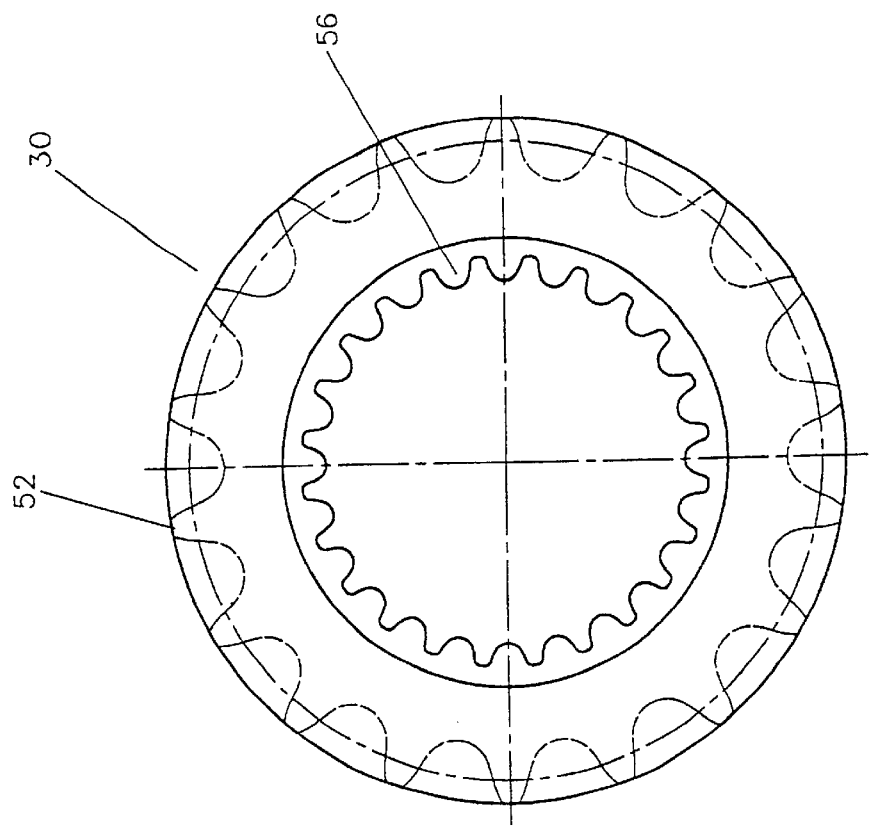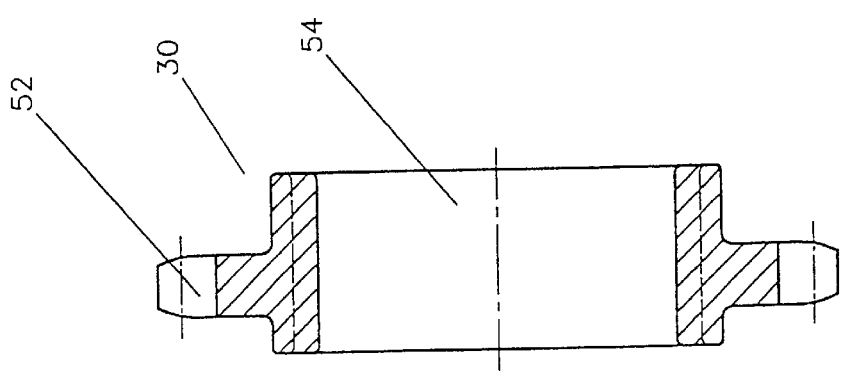
FIG. 7

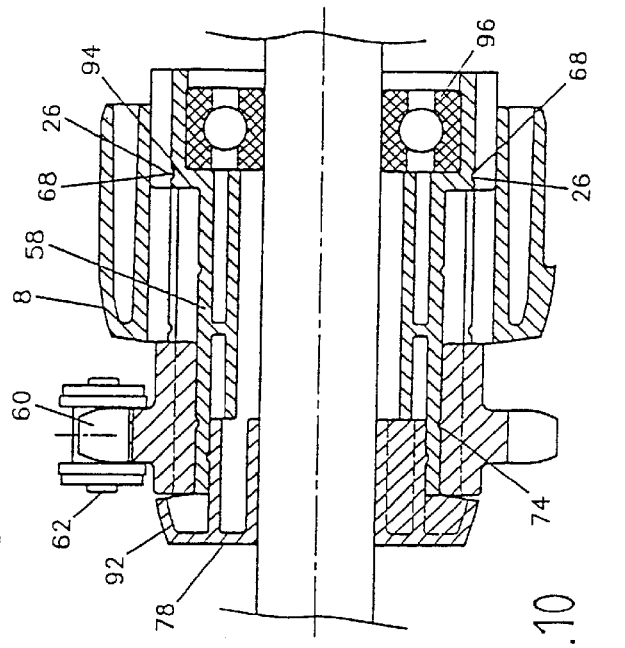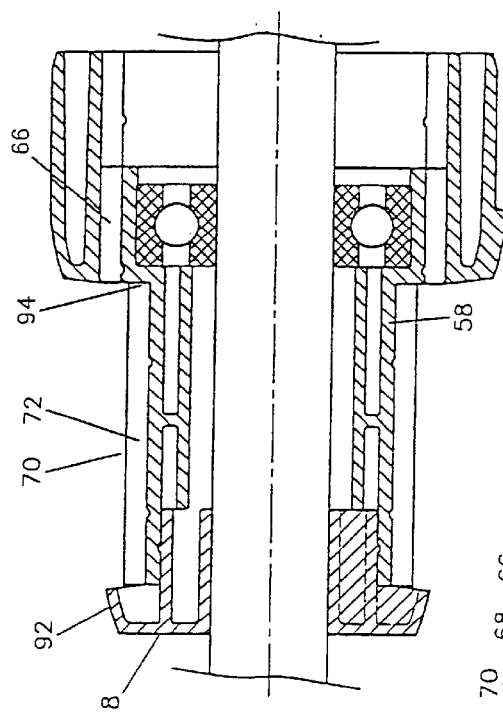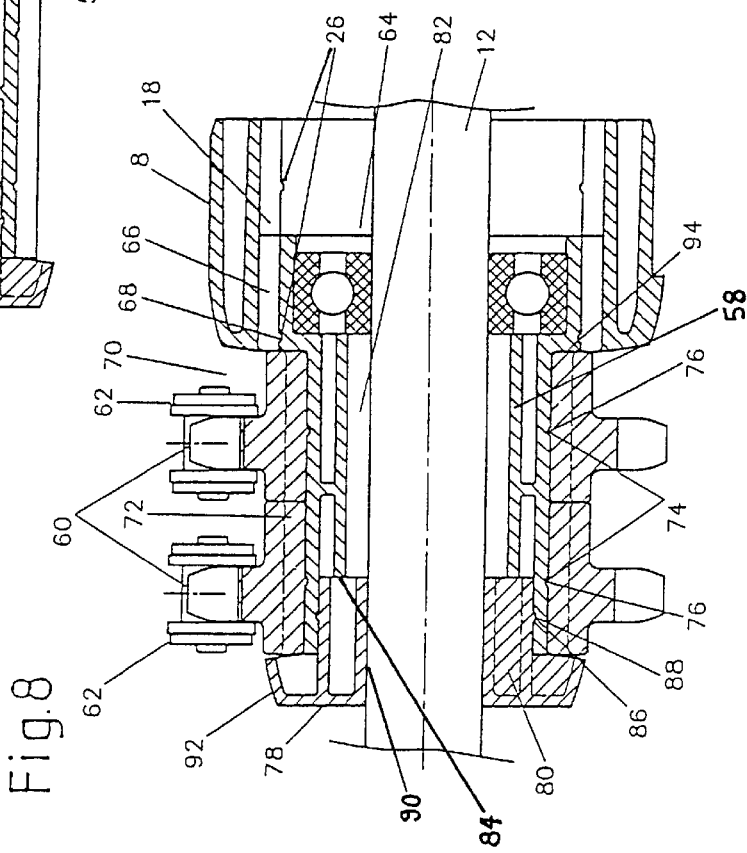

DRIVING ROLL

The invention pertains to a driving roll and specifically a driving roll or a driven roll for use in a roller conveyor or as a driven carrying roll for a belt conveyor.

Driving rolls such as those employed in roller conveyors or as carrying rolls in belt conveyors conventionally consist of a cylindrical roller body, which its terminated at both ends by a roller base. The roller bases contain the bearings for the seating of the driving rolls on a roller axis. In a driving roll or one driven roll, a roller base is generally designed as a driving member by means of which a driving force is transferred to the roll. Depending on their purpose, the driving rolls can be driven over belts, especially cogged belts or chains. In this case, depending on the selected driving means the driving member must be designed as a chain wheel or a toothed wheel for a cogged belt.

In addition, various possibilities are available to drive a multitude of driving rolls arranged in series. On the one hand, the possibility is available to drive all driving rolls tangentially over a continuous cogged belt or a continuous chain. On the other hand, the possibility of a drive from roller to roller is also possible. In the case of a drive from roller to roller, two rollers each are connected with each other via a cogged belt or a chain. This means that the driving members must include two chains or toothed wheels, one for the connection with the preceding roll and one for connection with the following roll.

These different driving possibilities imply a multitude of different design shapes of the driving members. For example, the driving members for the tangential drive using cogged belts must include a toothed wheel, for tangential drive using a chain, a chain wheel, for the drive using cogged belts from roll to roll two toothed wheels each and for the drive using a chain from roll to roll two chain wheels each. These four possibilities alone include four different driving members. Other variation possibilities of the driving members may result from different types of bearings.

Because of the multitude of differently designed driving members, the known driving rolls imply high manufacturing and warehousing costs for the availability of individual parts. In addition, the availability of replacement parts is problematic, since all types of driving members must be kept in storage to ensure availability of replacement parts.

The purpose of this invention is to create an improved driving roll, which because of its simplified design allows interaction with numerous different types of drives.

This task is resolved by means of a driving roll with the characteristics indicated in Claim 1. The subclaims present advantageous design forms.

The universal coupling device of the drive roll according to the invention permits the variable installation of different drive wheels, without such implying changes of modifications to the roller base. All drive wheels have a standardized design such that they can be optionally connected with the driving roll. This modular design of the driving roll reduces the number of required individual parts for the implementation of the most diverse types of drives, so that the manufacturing and warehousing costs for the driving rolls can be reduced considerable.

In one of the first potential designs according to the invention the driving roll presents the coupling device an opening and a driving member inserted into the opening in the longitudinal direction of the roller, which extends in the longitudinal direction over the free end of the roller base and in at least two insertion positions, in which the driving rolls are inserted so far that they can be fastened to it. The fact that the driving roll is inserted at different lengths and can be fastened in these different insertion positions, makes it possible that this driving member can be used for the arrangement of two chain wheels or toothed wheels as well as for the arrangement of only one toothed wheel or chain wheel, since the extent of the driving member in the longitudinal direction of the roll can be modified to the pertinent toothed or chain wheel. Here, at least two different defined insertion positions are available. However, more than two predefined insertion positions can be provided or the driving member can be designed in such a manner that it can be fastened in a position inserted at any optional length in the driving roll. Thus different distances of the driving roll in the longitudinal direction of the roll can be reached over the free end of the roller base. However, in contrast with the known driving rolls no separate driving members are required. The driving member is merely positioned differently on the driving roll and then fastened. This construction eliminates the necessity of providing different driving members for the different types of drives.

Only one driving member is required, which can be used for a multitude of different types of drives. Depending on the desired type of drive, a different number of different drive wheels, such as toothed wheels or chain wheels, can be placed on the driving member. This reduction of the different number of individual parts also allows a reduction of the manufacturing costs, since only one driving member at a corresponding total number must be manufactured. In addition, the warehousing costs are greatly reduced and the supply of replacement parts is considerably simplified.

Advantageously the driving roll includes latching means for the fastening of the driving member at any of the at least two insert positions. Such latching means simplify the mounting of the driving member on the driving roll, since the driving member must merely be inserted in the opening in the base of the roll of the driving roll and is latched there in the desired position with the driving roll. Thus, no additional mounting parts or mounting steps for the fastening of the driving member to the driving roll are required. The latching means are preferably designed in the form of ring shaped latching protrusions on the inner side of the opening in the roll base and in the form of corresponding ring shaped grooves on the outside of the driving member. Several different latching grooves are arranged interspaced from each other on the surface of the driving member in order to ensure the latching of the driving member in the various desired insertion positions.

Preferably, the driving roll presents at the opening of the roll base a wedge shaped profile or a toothed profile, which meshes into the corresponding wedge profile or tooth profile of the driving member. Such a profile allows a reliable transfer of forces from the driving member to the driving roll. It is especially advantageously when the profile extends on the driving member in the longitudinal direction of the roll over the entire length of the driving member, so that for any insertion position the meshing of the wedge or tooth profile of the driving roll into the profile on the driving member is possible. This ensures a secure transfer of force independent of the insertion position.

Preferably the tooth profile on the driving member is designed corresponding to the profile of a cogged belt. Such a design makes the additional inclusion of a toothed wheel for the accommodation of a cogged belt on the driving member superfluous, the cogged belt can mesh directly with the profile arranged on the driving member. This signifies that the tooth profile on the driving member is used for the transfer of force from the cogged belt to the driving member as well as for the transfer of force from the driving member to the driving roll. Thus an additional reduction of components is achieved. In the event of a drive from roll to roll, i.e., two cogged belts mesh with each driving member, it is advantageous to place in the free area of the part extending away from the roller base a spacer, which divides the free area in two areas, on each of which a cogged belt runs. In this manner it can be ensured that despite the continuous toothed profile, the two cogged belts do not touch.

Preferably at least one drive wheel, especially a chain wheel, can be placed on the driving member. The described driving member can therefore also be used for other types of drives, for example for the propulsion of a steel roller chain. A corresponding drive or chain wheel is merely placed on the driving member. Accordingly, no special driving member is required, which implies that the number of different individual parts can be reduced.

The at least single drive wheel engages preferably into the tooth profile on the outside of the driving member. This ensures a reliable transfer of force also between the drive wheel and the driving member and therefore the driving roll. The driving member, which presents a tooth profile adapted to a cogged belt, can thus be adapted to other driving elements through the simple placement of a drive wheel or chain wheel. Again, no special driving member is required, i.e. minimum of different individual parts can be attained with numerous types of drives which means that the manufacturing and warehouse costs are reduced.

Preferably, a roller axis is placed through the driving member in the longitudinal direction of the roll, on which the driving member is positioned in a pivoting manner with at least one bearing. In this manner the radial forces induced by the driving member, such as a steel roller chain or a cogged belt, can be absorbed directly at the location of the introduction of the force. Preferably, the driving member is designed in its interior in such a manner that several bearing positions are provided, in which a wide variety of bearings can be used depending on the employment purpose. Plain bearings made of a synthetic material can be used for low loads, while at high loads roller bearings are preferably used. The type of roller bearing depends on the selected driving means and the employment location of the driving roll. Ideally, the bearing is designed in such a manner that the driving roll does not require additional bearings at this end on the side of the drive. A conventional roller base with additional bearings is preferably provided at the other end of the driving roll.

As an alternative to the first design, the coupling device can be designed as a first holding device which contains at least one drive wheel, whereby the drive which comprises at a first face a coupling device, which meshes with the first holding device at the roller base, and which possesses at the opposite second face a second holding device for the connection of additional drive wheels or a coupling device. Different drive wheels can be installed very easily on the mounting device by means of their coupling devices. Thus, depending on the desired drive, different drive wheels can be installed on an unchanged, i.e. universally usable roller body and roller base. In addition, any given additional drive wheel can be installed without problems on a drive wheel already installed in the roller base, since the first drive wheel on the front side away from the roller body, possesses a second mounting device, on which an additional drive wheel can be installed by means of a here provided coupling device included or terminating device. This results in a highly flexible, modular construction of the drive unit for the driving roll. Drive wheels of different sizes and designed differently in terms of their circumference can be employed which can be installed, depending on the requirements, in different numbers on an unchanged driving roll or roller body. For example, the drive wheels may have different diameters, or they can be designed as chain wheels or cogged wheels.

Preferably, the second holding device on the drive wheel is identical in its design to the first holding device on the roller base. This allows an even more flexible use of the drive wheels, since one and the same drive wheel can be connected directly with the roller base or can also be installed as a second drive wheel at a first drive wheel which is connected with the roller base. This allows a considerable reduction of the multitude of parts, since no differently designed drive wheels are required for use as the first or the second drive wheel.

An additional preference is that the driving roll includes two identically designed drive wheels, whereby the first drive wheel is connected with its connection device to the first mounting device in the roller base and the second drive wheel is connected with its connection device to the second holding device on the first drive wheel. This arrangement is preferred, when the drive is achieved from roller to roller, i.e. one chain or one belt connects two rolls with each other. The identical design of the drive wheels offers a high variability for the adaptation of the drive to the different usage purpose while requiring a limited number of different components.

It is advantageous that the first mounting device is shaped in the form of an opening in the roller base, in which the drive wheel can engage with its connection device shaped in the form of a protrusion. With this design the different drive wheels are simply inserted in the roller base or another drive wheel, which results in an easy mounting. Advantageously, the opening contains a profile into which the corresponding profile on the protrusion engages, so that a solid connection is achieved between the drive wheels or a drive wheel and the roller base, which permits a reliable transfer of force from the drive wheels to the roller base and therefore the roller body. However, the openings and protrusions can also be designed in such a manner that a non-positive connection between the drive wheels and the roller body is achieved.

The mounting and connection devices preferably include latching means, especially in the form of latching grooves and the corresponding latching protrusions. This allows that when the drive wheels are inserted in each other or in the roller based, they are locked or snapped there, which results in a firm connection between the individual components, so that an unintentional separation can be prevented. No additional mounting processes, such as for example bolting, are required for connection the drive wheels with each other or with the roller base.

Preferably at least one drive wheel is a chain wheel. Such a drive wheel allows that a chain drive or a conveyor chain drive is used to drive the rolls, which permits an extremely reliable transfer of force. Depending on the desired gear ratio, the employed chain wheels can be designed with different diameters or number of teeth, so that an extremely flexible adaptation of the drive to the individual requirements of the roller trajectory or conveyor belt is possible.

In addition, the drive wheel preferably possesses on its circumference a toothed design for engaging a cogged belt. Thus it is very easy to drive an unchanged, i.e. universal driving roll, if desired, also by a cogged belt, whereby merely another drive wheel with the corresponding toothing must be installed on the roller base. Again, depending on the desired transfer ratio the drive wheels may have different diameters and numbers of teeth. If a drive from roll to roll is preferred, the preferably identical toothed wheels can again be placed behind each other on the roller base.

It is preferred that at least one drive wheel is placed on the axis carrying the driving roll. In this manner the radial forces applied by the driving means, such as for example a chain or a cogged belt can be transferred to the roller axis without being induced into the driving roll and without affecting action.

It is purposeful to provide on at least one drive wheel a seat for the holding of a bearing. For example, a corresponding bearing, such as a roller bearing, can be incorporated directly on the drive wheel, so that larger occurring forces, especially radial forces, can also be transferred in a reliable manner onto the roller axis.

Preferably, at least one drive wheel and/or the terminating device possesses a plain bearing surface which is in sliding contact with the axis. This design is extremely cost effective since no additional bearing elements need to be employed. For example, especially when the drive wheel and the terminating device are made of synthetic material, these can slide directly on the roller axis. This design is especially favorable for driving means which transfer only limited radial forces to the drive wheel, as is, for example, the case with a tangential drive of the drive wheels by means of cogged belts or chains.

The following contains a description of the invention based on the attached drawings.

The following is shown:

FIG. 1: A cutaway view of the driving roll according to the invention with the use of a drive by means of steel roller chain from roll to roll, FIG. 2: the roller base on the side of the drive FIG. 3: the drive member, FIG. 4: a cutaway view of the end of the driving roll on the drive side using a tangential cogged belt drive, FIG. 5: a cutaway view of the end of the driving roll on the driving side when using a cogged belt drive from roll to roll, FIG. 6: a cutaway view of the end of the driving roll on the driving side when using a tangential drive by means of a steel roller chain, FIG. 7: a chain wheel, FIG. 8: a cutaway view of a second design of the end of the driving roll on the driving side using a drive by means of a steel roller chain from roll to roll, FIG. 9: a cutaway view of a second design of the end of the driving roll on the driving side using a drive by means of a toothed belt, and FIG. 10: a cutaway view of a second design of the end of the driving roll on the driving side using a tangential drive by means of a steel roller chain.

Figure 11:
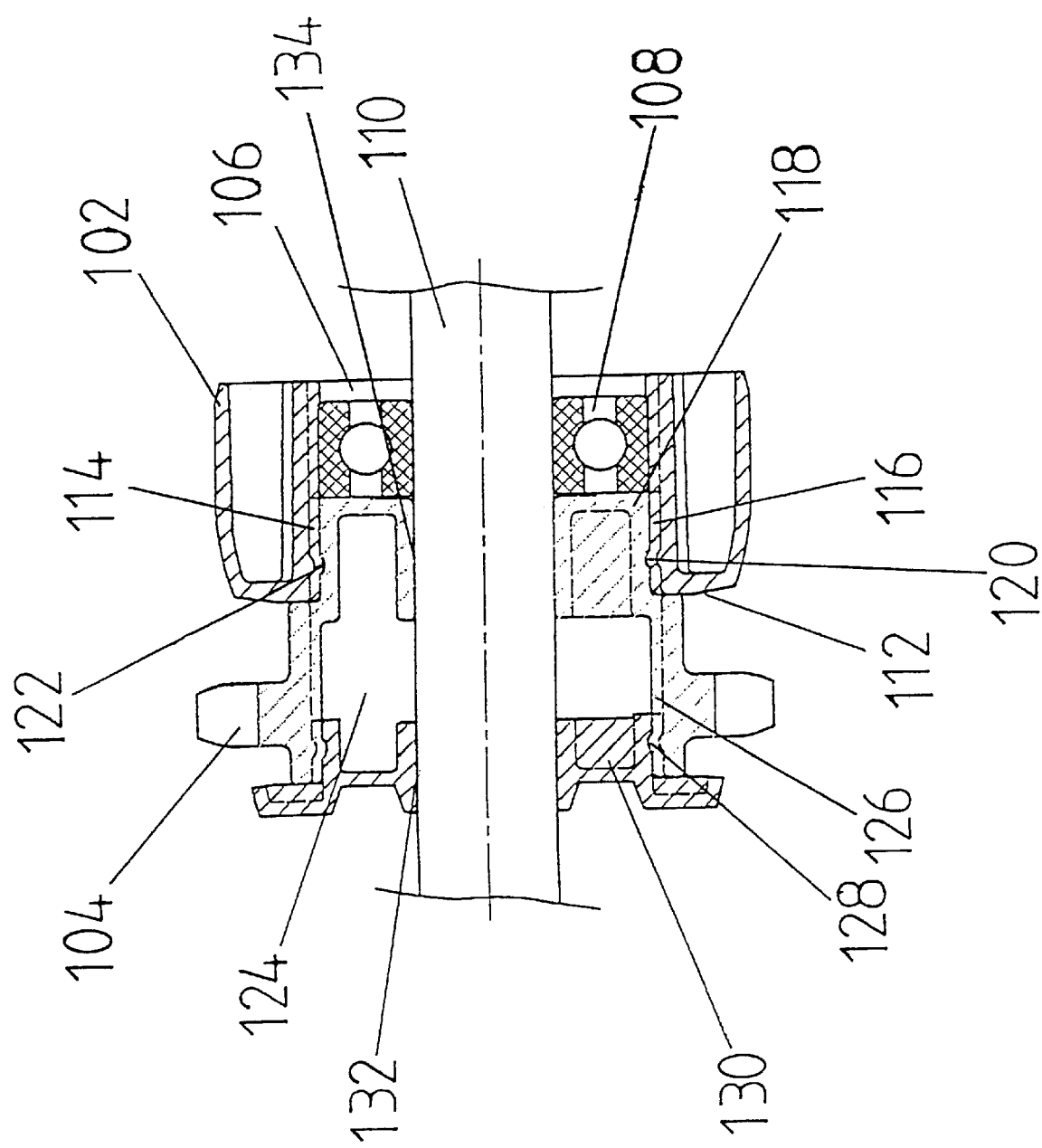
Figure 12:
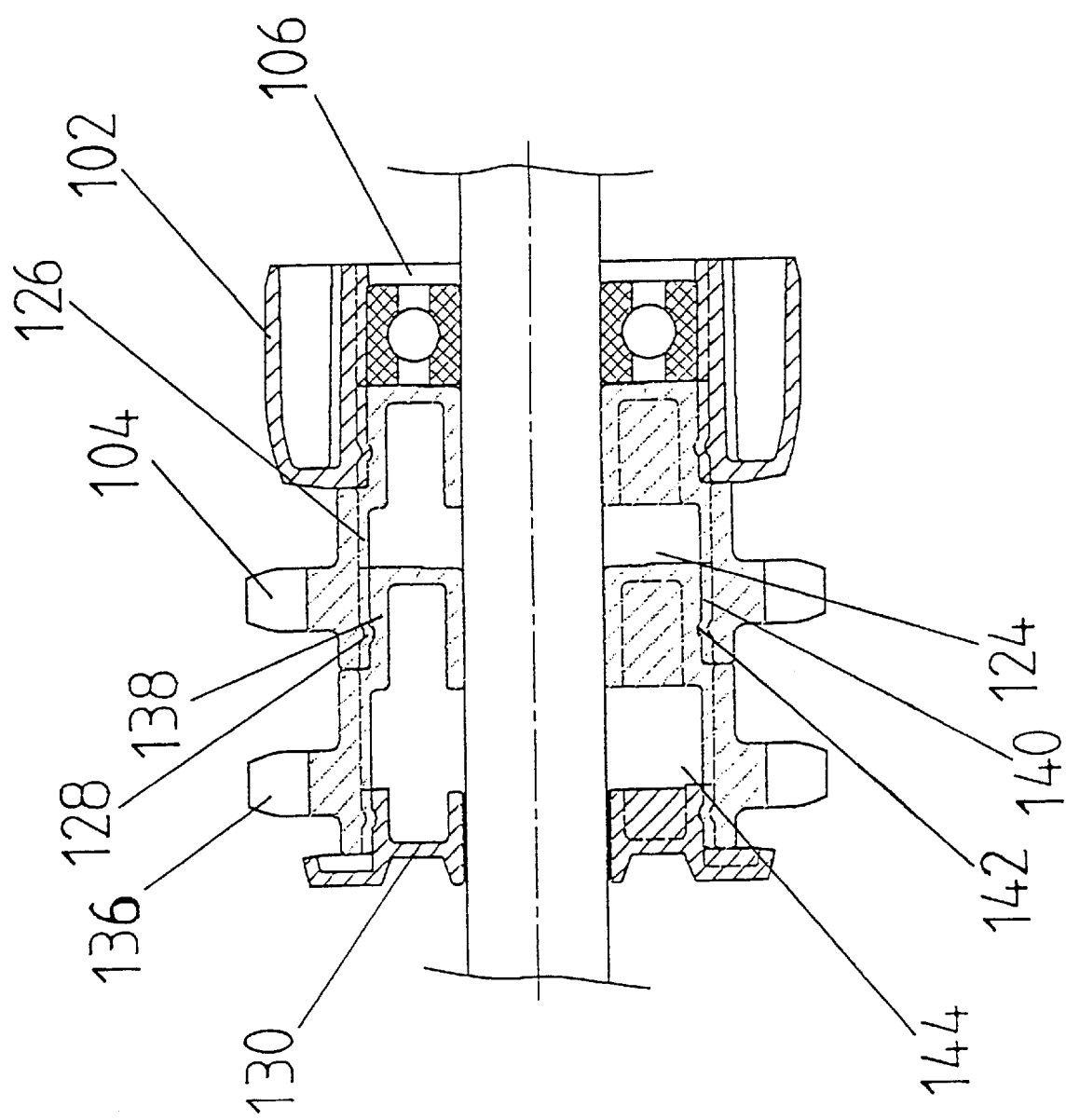
Figure 13:
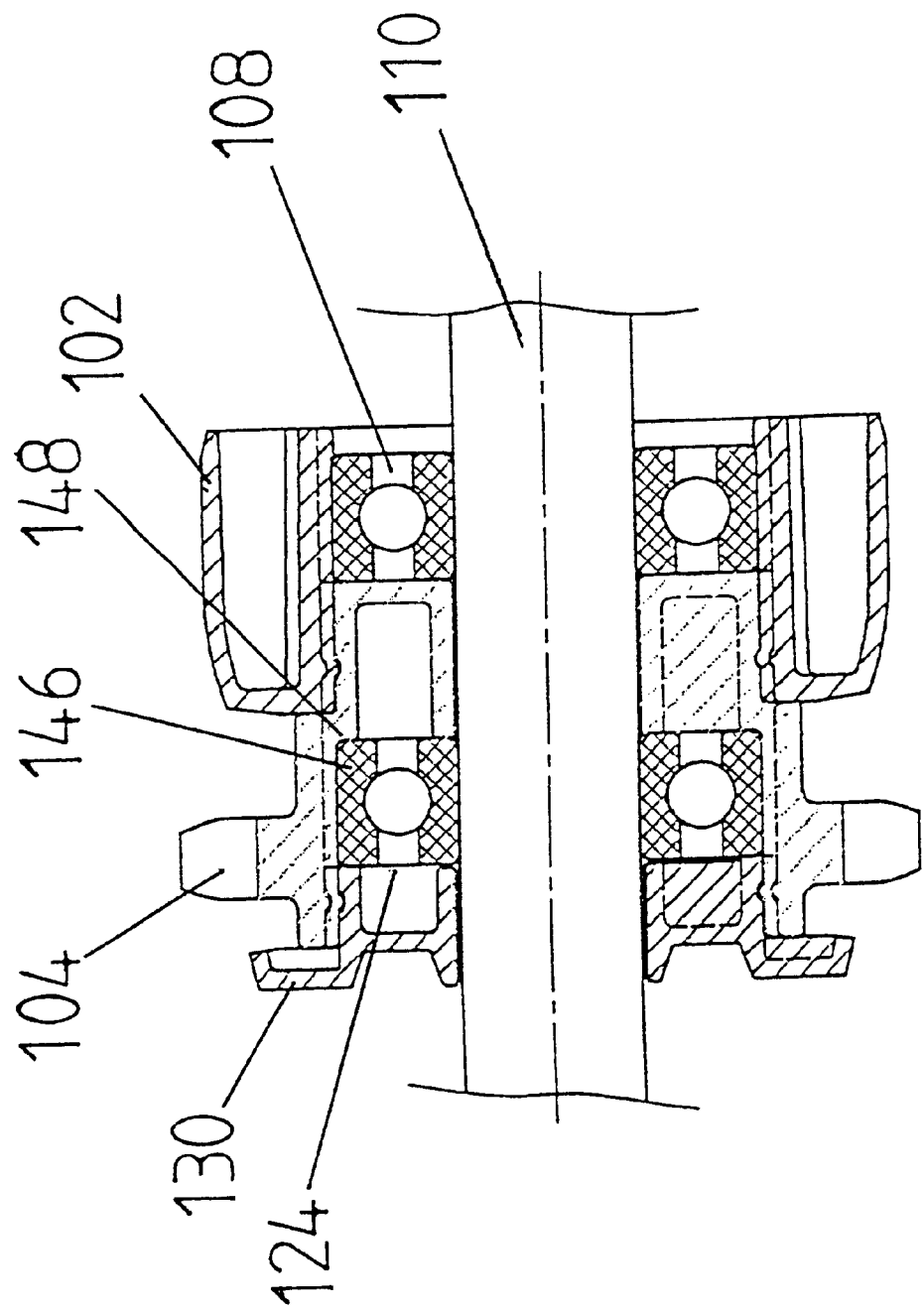
Figure 14:
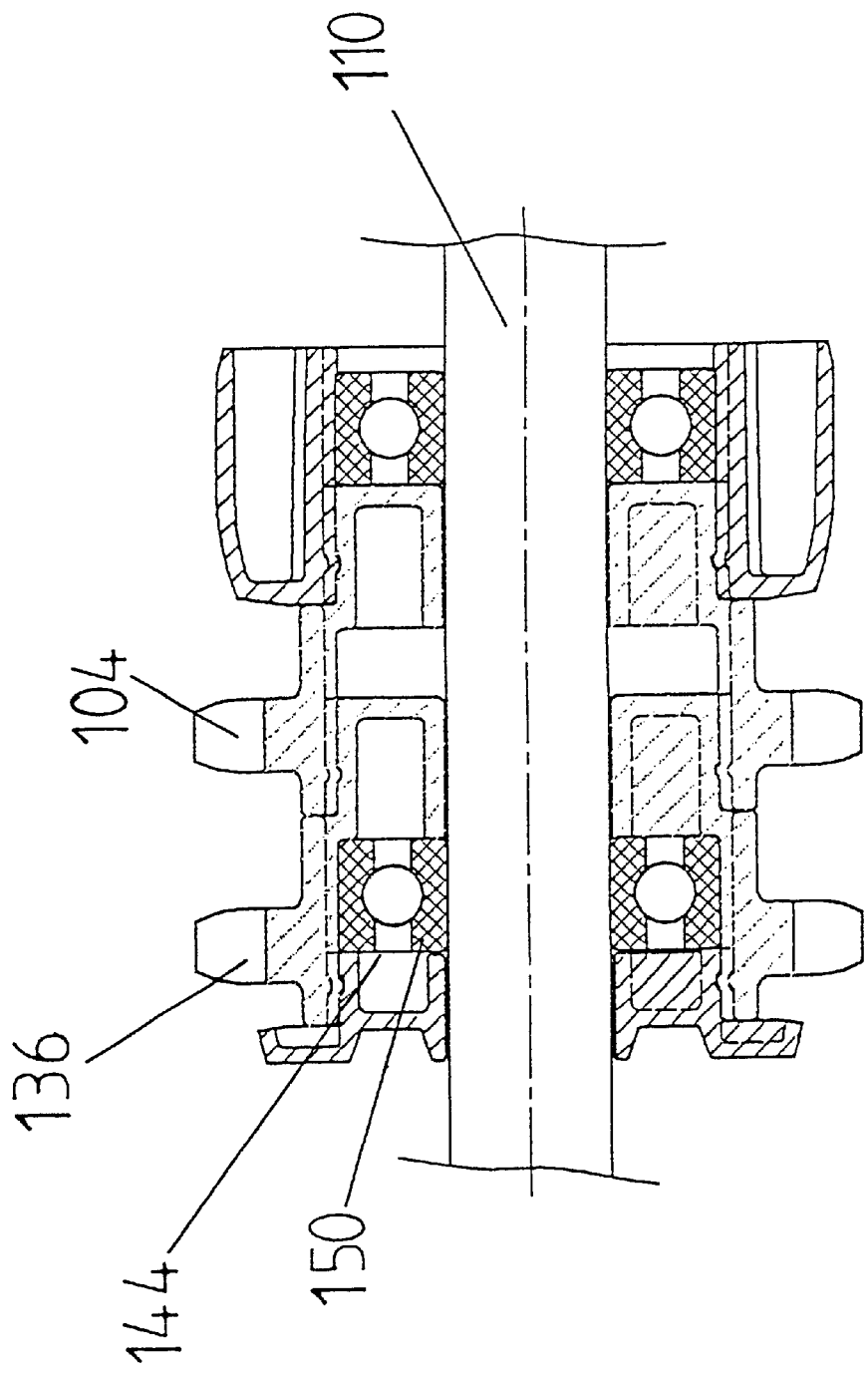
Figure 15:
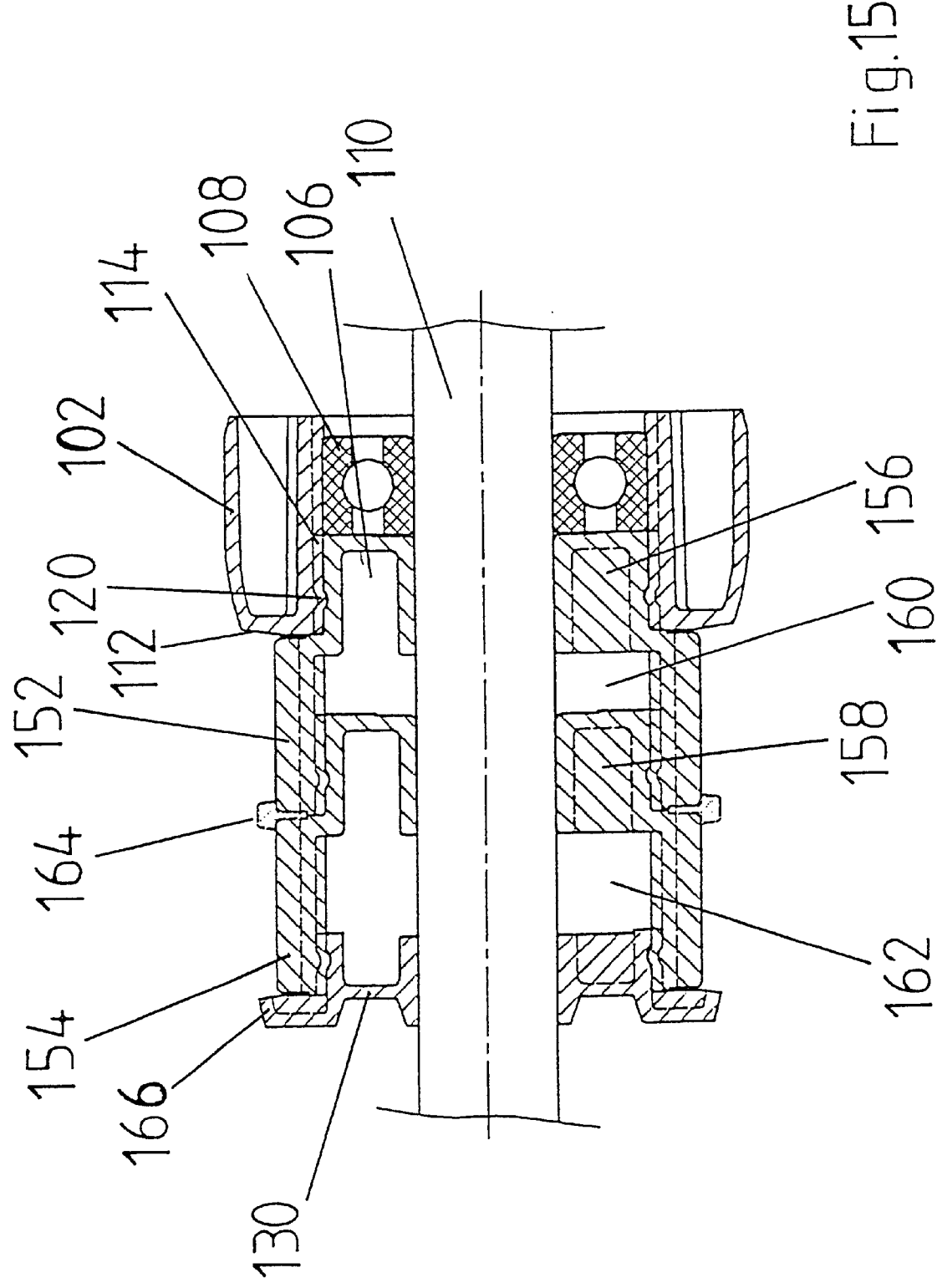
Figure 16:
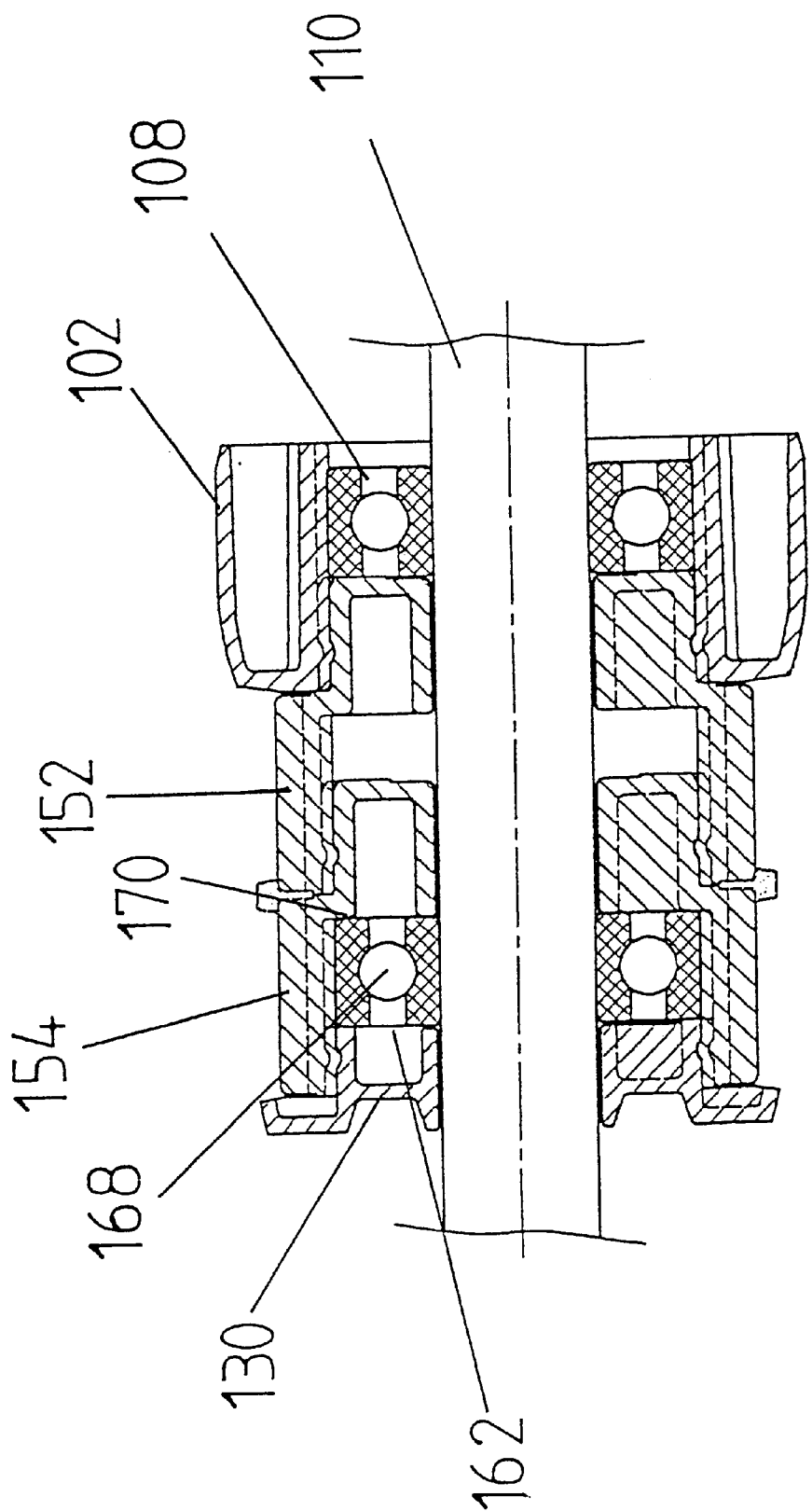

FIG. 11: a cutaway view of a roller base with an installed chain wheel,

FIG. 12: a cutaway view of a roller base with two installed chain wheels,

FIG. 13: a cutaway view of a roller base with an installed chain wheel with an inserted roller bearing, FIG. 14: a cutaway view of a roller base with two installed chain wheels and one inserted roller bearing, FIG. 15: a cutaway view of a roller base with two installed toothed wheels for a drive using a cogged belt, and FIG. 16: a cutaway view of a roller base with two installed toothed wheels and an inserted roller bearing.

The initial fundamental design form of the present invention is described with reference to FIGS. 1 to 10.

FIG. 1 depicts a cutaway view of a driving roll driven by a steel roller chain from roll to roll. Driving roll 2 consists of an essentially cylindrical roller body 4, whose two longitudinal ends are closed by roller bases 6, 8. Roller body 4 and roller bases 6, 8 can be made of metal or synthetic material, depending on their usage purpose. Roller base 6 essentially corresponds to a conventional roller base and includes a bearing 10, with which roller base 6 and roller body 4 are installed in a pivoting manner on a roller axis 12. End 14 of roller body 4 on the drive side includes roller base 8, which possesses a continuous opening 16. Opening 16 has an essentially cylindrical basic shape and extends parallel to roller axis 12 in the longitudinal direction of the roller. Opening 16 possesses on its inner side a toothing 18, in which an external toothing or a tooth profile 20 of a driving member 22 meshes. Driving member 22 also has an essentially cylindrical fundamental shape and is inserted in the longitudinal direction of the roller in roller base 8. The driving member is advantageously made of a synthetic material, but may be made of metal in case of higher stresses. At its free longitudinal end, turned away from roller base 8, driving member 22 includes an edge or a protrusion 24, which extends radially outward over tooth profile 20. The inner surface of opening 16 contains ring-shaped latch protrusions 26, which can engage in the corresponding ring-shaped latch grooves 28 on the outer surface of driving member 22. The latch grooves 28 extend along the outer circumference of driving member 22. Due to the toothed inner surface of opening 16 and the toothed external surface of driving member 22, latch protrusions 26 and latch grooves 28 do not extend continuously, but preferably only in the area of the crests of the teeth or the feet of the teeth. In the design form described here, latch protrusions 26 are formed at the tooth crests of toothing 18 of roller base 8 and the latch grooves 28 are formed in the area between the individual teeth of tooth profile 20 on the circumference of driving member 22 (See FIG. 4). Two latch protrusions 26 and two latch grooves 28 are provided, which are always interspaced at the same distance in the longitudinal direction of the roll. In the example depicted here, only the outer end 14, i.e. the end turned toward driving roll 2, of latch protrusion 26 meshed with the outer latch groove 28. In other implementation examples, both latch protrusions 26 may mesh with the two latch grooves 28, when driving member 22 is inserted further into opening 16.

Two chain wheels 30 are arranged on the surface of driving member 22, which are fixed in axial direction between protrusion 24 and roller base 8. Chain wheels 30 present on the inside an opening with an inner toothing 32 which is shaped fitting to the tooth profile 20 on driving member 22. During mounting, chain wheels 30 are pushed on driving member 22 on its side without edge or protrusion 24 and next driving member 22 is inserted in opening 16 of roller base 8, where latch protrusions 26 mesh with latch grooves 28. Thus, mounting can be performed extremely fast and simple.

The interior of driving member 22 contains two ball bearings 34 in the area of the two longitudinal ends of driving member 22. Ball bearings 34 are retained between offsets 36 at the inner contour of driving member 22 and latch protrusions 38. Thus, during mounting ball bearings 34 can easily be inserted into the interior of driving member 22, where they latch between latch protrusions 38 and offsets 36. Ball bearings 34 rest with their inner bearing ring on roller axis 12. The free end of driving member 22, i.e. the end turned away from roller body 4, is closed by a sealing element 40, which is locked by a protrusion 41 to the driving member 22, which meshes in a corresponding groove on sealing element 40. Sealing element 40 presents in its center a through-hole 42, through which roller axis 12 passes, whereby the lateral walls the through-hole 42 have a closing contact with the roller axis.

Figure 2:
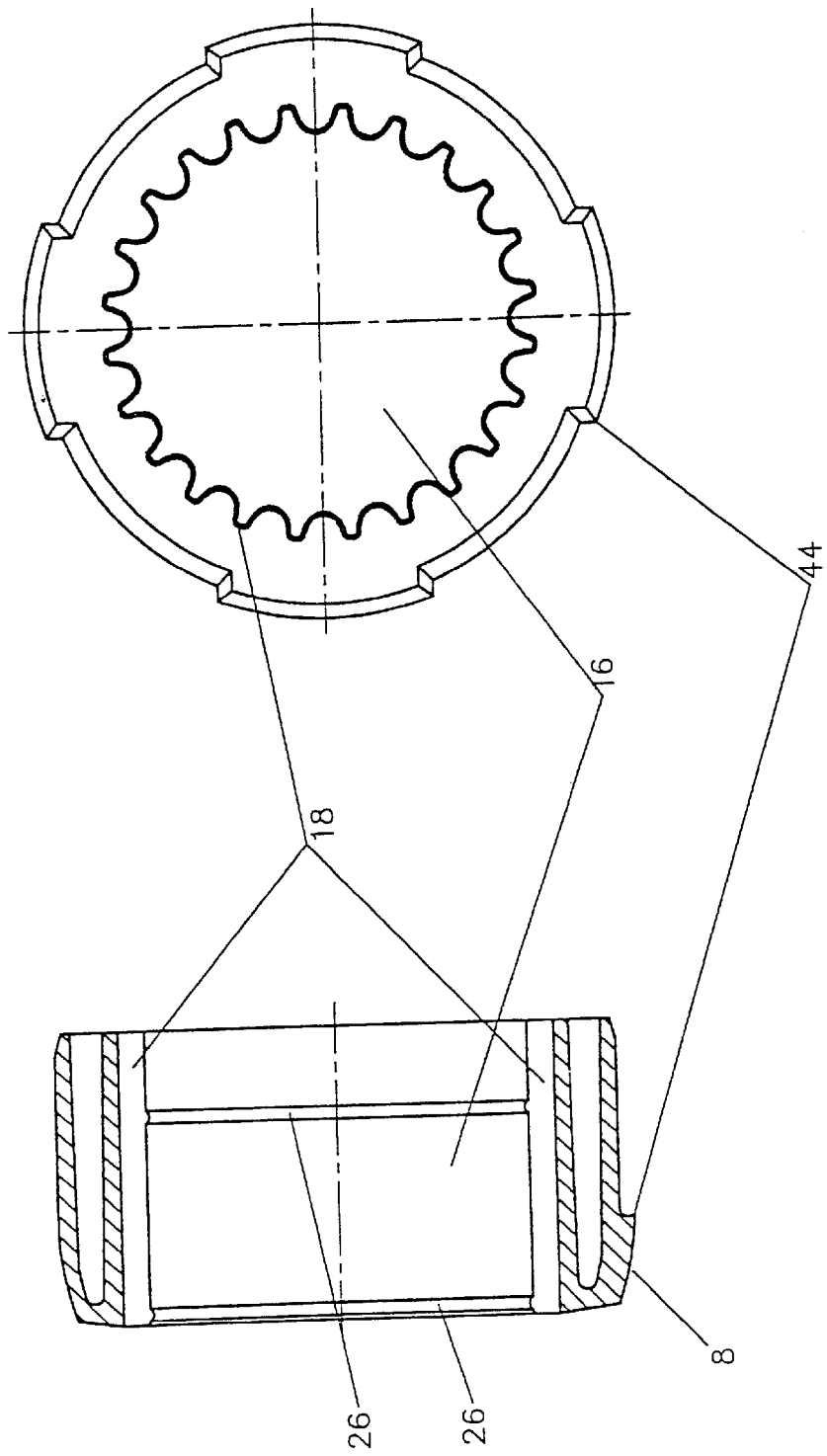

FIG. 2 represents detailed views of roller base 8. Roller base 8 essentially has a pipe shaped form, whereby on one longitudinal end protrusions 44 are formed, which can engage in corresponding indentations of roller body 4, so that a reliable transfer of force can be assured by a sealed design. On its interior, roller base 8 presents an opening 16, which contains on its circumference a toothing 18. Here, the teeth of toothing 18 possess an arc-shape cross-section, but may also present other shapes, for example, trapezoid or rectangular shapes. In addition latch protrusions 26 are arranged interspaced on the inner surface of opening 16 in the longitudinal direction of the roll. Latch protrusions 26 extend in the direction of the circumference along the inner surface of opening 16. They are not continuous but rather are interrupted in the area of the interstices of the teeth of toothing 18 (not depicted here). Latch protrusions 26 essentially present a semi-circular cross-section, which permits easy latching with the corresponding latch grooves 28. Nevertheless, latch protrusions 26 are not limited to a semi-circular cross-section, but rather latch protrusions 26 may also present a sphenoid cross-section. Despite its complex shape, such a roller base can be easily manufactured from synthetic material, for example using injection molding.

Figure 3:
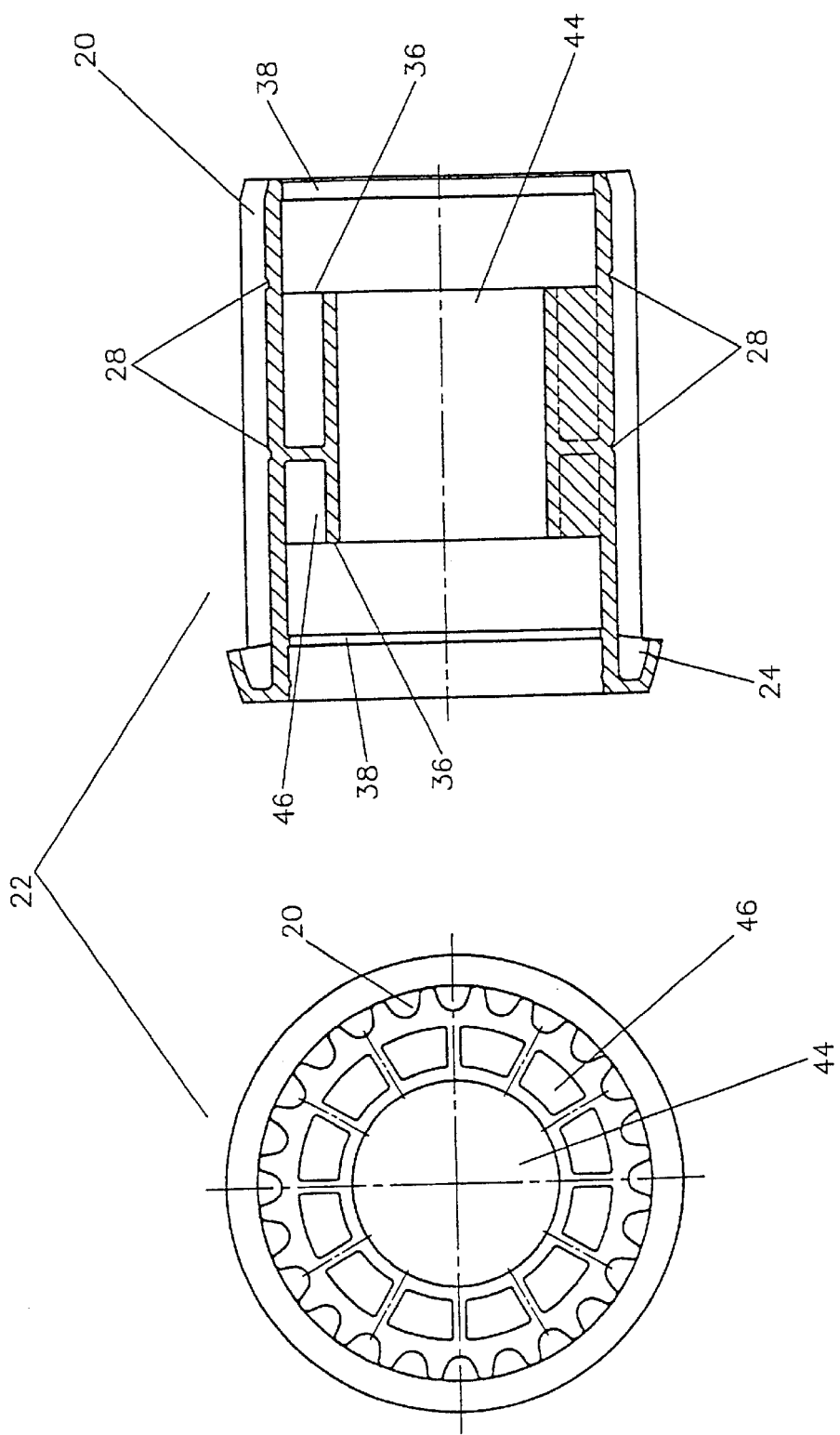

FIG. 3 shows driving member 22 in detail. Driving member 22 possesses an essentially cylindrical shape. Tooth profile 20 extends in the longitudinal direction over virtually the entire length of driving member 22. Tooth profile 20 is formed here by semi-circular grooves in the surface of driving member 22. However, the tooth profile may also present other shapes, for example a trapezoid or rectangular cross-section. Two latch grooves 28 extend along the outer circumference of the driving member. In the axial, i.e. the longitudinal direction of the roller they are interspaced at the same distance as the two latch protrusions 26 in opening 16 of roller base 8, so that when driving member 22 is inserted correspondingly into roller base 8, both latch protrusions 26 can latch simultaneously with a corresponding latch groove 28. Latch grooves 28 do not extend continuously along the outer contour of tooth profile 20, but are only formed in the tooth interstices at the foot circle of tooth profile 20. A protrusion 24 extending radially outward is formed at one longitudinal end of driving member 22. In its interior, driving member 22 presents a hole 44, through which roller axis 12 can extend. Through-hole 44 is shaped such that it is gradually expanded towards the ends of driving member 22. This creates the offsets 36 turned toward the openings, which serve for the support of the employed bearings 34. Latch protrusions 38 are spaced at a distance from these offsets 36 toward the open ends of driving member 22, so that inserted bearings 34 can be fixed between offsets 36 and latch protrusions 38. The middle section of driving member 33, which forms the offsets 36, is not massively designed but rather presents cavities 46. These cavities 46 in driving member 22 permit a saving of material and thus also a reduction in weight. Driving member 22 is preferably manufactured from synthetic material, whereby notwithstanding the complex shape an economical production is possible, for example using injection molding. Driving member 22 can also be made of metal.

FIG. 4 depicts a cutaway view of the driving side end of the driving roll according to the invention for the use of a drive in the form of a continuous, tangentially engaging cogged belt. Driving member 22 is identical to driving member 22 depicted in FIG. 1, whereby here too the driving member 22 latches with its other latch groove 28 in the outer latch protrusion 26 of roller base 8. Driving member 22 depicted here does not include additional drive wheels so that tooth profile 20 is exposed and can engage in a driving cogged belt. Protrusion 24 on the free end of driving member 22 acts as the stop or guiding edge for the cogged belt, so that it cannot slide down from driving member 22. On the other side of driving member 22, a potential lateral movement of the cogged belt is restricted by roller base 8. This ensures a reliable passage of the cogged belt on tooth profile 20 of driving member 22. Contrary to the implementation example depicted in FIG. 1, the implementation example depicted here presents only one ball bearing 34, which is arranged on the end of driving member 22 turned toward roller base 8. Ball bearing 34 is placed in the area of driving member 22, which is inserted in opening 16 of roller base 8, so that ball bearing 34 is positioned within roller body 4, not depicted here. Thus a radial load of the roller body caused by conveyed objects can be assumed directly by roller axis 12. Contrary to the example depicted in FIG. 1, the other free end of driving member 22 includes a bushing 48. Bushing 48 is preferably manufactured from a highly smooth synthetic material and essentially presents a ring-shaped form. Bushing 48 is inserted into the opening of the free end of driving member 22, whereby it presents latching grooves 49 on its outer circumference, which latch into latch protrusions 38 and 41 as described with the aid of FIG. 1. Thus latch protrusions 38 and 41 are used not only for the retention of a ball bearing or a sealing element, but also fix bushing 48. In the middle, the bushing presents an opening, with the lateral walls of which bushing 48 slides on roller axis 12. In the implementation example shown here, a simple synthetic material bushing 48 can be used on the free end, since no great radial forces are exerted on driving member 22 in the presence of a tangential drive by means of a cogged belt. However, as has been described, the other free end of driving member 22 must include a load bearing, here in the form of a ball bearing 34, since this bearing must accept the radial forces acting on roller body 4. An additional sealing element at the free end of driving member 22 is not required, since bushing 48 itself closes the opening between roller axis 12 and the inner surface of driving member 22.

FIG. 5 depicts a cutaway view of an end of the driving roll according to the invention on the drive side for use with a cogged belt drive from roll to roll. Driving member 22 is here identical to the driving members described for the earlier implementation examples and is fastened to roller base 8 in the same position and manner as that described in FIG. 1 and FIG. 4. The arrangement of ball bearing 34 and sealing element 40 corresponds to the arrangement described earlier with the help of FIG. 1. As was the case for the example depicted in FIG. 4, no additional drive wheels are placed on driving member 22, so that tooth profile 20 is exposed. In contrast with FIG. 4, in this implementation example spacer 50 has been placed in the middle of the exposed area of tooth profile 20, which divides the free area of tooth profile 20 into two sections. A cogged belt can run in each of the two sections, whereby one cogged belt connects driving roll 2 with the preceding driving roll and the second cogged belt connects driving roll 2 with the next driving roll.

Spacer 50 prevents contact between the two cogged belts, which could damage the cogged belts and cause uneven running. At both ends of driving member 22 the two sections of tooth profile 20, which serve as toothed wheels for the cogged belt, are delimited by protrusion 24 and roller base 8. On its inside spacer 50 presents a latch protrusion 51 which latches into the free latch groove 28, which is not meshed with a latch protrusion 26 of opening 16 of roller base 8, and in this manner fixes spacer 50 on tooth profile 20 of driving member 22. Latch protrusion 51 has a shape which corresponds to the shape of latch protrusion 26. Spacer 50 presents on its inside a inner tooth profile corresponding to tooth profile 20, so that spacer 50 can be inserted on tooth profile 20 of driving member 22. Latch protrusion 51, similar to latch protrusion 26, does not extend continuously though the inner tooth profile, but is only formed in the area of the teeth crests, i.e. latch protrusion 51 is interrupted in the area of the teeth interstices. Due to the fact that latch protrusion 51 has a shape corresponding to latch protrusion 26, spacer 50 can be latched in latch groove 28, which, when driving member 22 is further inserted into roller base 8, meshes with latch protrusion 26 which is turned to the free end of roller base 8. Thus spacer 50 can easily be fixed in an axial direction on tooth profile 20, without this requiring additional fastening elements on driving member 22. The same driving member 22 can therefore also be used for the application example.

In the application example depicted in FIG. 5, a ball bearing 34 is also located on the free end of driving member 22 turned away from driving member 22, as was described in FIG. 1. In this application example a ball bearing 34 is included in order to absorb the radial forces generated by the initial tension of the cogged belt. In the case of a drive from roll to roll the cogged belts contact driving member 22 in contrast to a tangential cogged belt drive, in which the cogged belt merely runs tangentially along driving member 22. This contact has as result that the radial forces are transferred to driving member 22, which, depending on the initial tension, may be so great, that they cannot be reliably transferred by a simple synthetic material plain bearing 48. In the case of the placement of a ball bearing 34 on the free end of driving member 22, a sealing element 40 is again installed similar to the application example depicted in FIG. 1.

FIG. 6 shows a cutaway view of the drive side end of driving roll 2 according to the invention, for the case of a tangential chain drive. In the arrangement depicted here, driving member 22, which is identical to the driving members depicted in the previous Figures, is inserted so far into opening 16 of roller base 8, that both latch grooves 28 are meshed with the two latch protrusions 26. Due to the fact that driving member 22 is further inserted in roller base 8 in the longitudinal direction of the roller, the free area of driving member 22, which extends away from roller base 8 or protrudes from opening 16, is reduced. This results in the free area of tooth profile 20 being reduced. In the application example depicted here, a chain wheel 30, which is identical to the chain wheels 30 depicted in FIG. 1, is inserted on tooth profile 20 of driving member 22 before the placement of driving member 22 on roller base 8. Chain wheel 30 meshes with the steel roller chain 31, placed tangentially along chain wheel 30, in order to drive driving roll 2. Chain wheel 30 possesses such a width or expansion in the longitudinal direction of the rollers, that it is fixed exactly between protrusion 24 of driving member 22 and roller base 8, i.e. the facing side of roller base 8. The arrangement of ball bearing 34 and sealing element 40 corresponds to the arrangement depicted in FIG. 1. Due to the fact that here driving member 22 is further inserted in roller base 8, the outer ball bearing 34, turned away from the roller body, when compared with the arrangement depicted in FIG. 1, is located closer to the end of roller body 4 and roller base 8. Thus both ball bearings 34 are located in the vicinity of roller base 8, i.e. in the end area of roller body 4, which is not depicted here. This arrangement of the ball is especially rigid and allows a favorable transfer of the radial forces acting on the roller body onto roller axis 12.

FIG. 7 depicts a chain wheel 30, as used in the arrangements shown in FIG. 1 and FIG. 6. On its outer circumference, chain wheel 30 presents teeth 52, which can engage in the corresponding indentations of a driving chain. In the middle, chain wheel 30 has a through-hole 54, whose circumferential planes have a tooth profile 56, which is shaped in such a manner that it can mesh with tooth profile 20 on driving member 22. A chain wheel 30 with such a design can be inserted on driving member 22, whose tooth profile has been adapted for use with a cogged belt, so that this same driving member 22 can be used with a cogged belt as well as with a driving chain. When used with a drive by means of driving chains from roll to roll, where two driving chains mesh on each driving roll, two of the described chain wheels 30 are inserted on tooth profile 20 of driving member 22, which compared to the use of a single chain wheel is less far inserted into opening 16 of roller base 8.

FIGS. 8, 9 and 10 depict another implementation example of driving member 58 according to the invention for application instances, in which in the presence of unchanged dimensions of the rolls, smaller driving tooth or chain wheels are used. Driving member 58 can also in this embodiment form be used in combination with different driving means. FIG. 8 depicts the case of a drive from roll to roll using a roller chain 62 in combination with smaller chain wheels 60. The roller bodies 4 and roller base 8 (not shown in FIGS. 8, 9 and 10) are unchanged in comparison with the previously described implementation examples. A different driving member 58 is used to accept the smaller chain wheels 60. Driving member 58 presents at its circumference in the area of end 64 turned toward roller base 8 a tooth profile 66. As far as its form is concerned this tooth profile 66 corresponds to the previously described tooth profiles 20 of the first embodiment form of driving member 22. Therefore, driving member 58 adapted to the employment of smaller chain wheels 60 can be used with the same driving roll or the same roller base 8 as those described for the previous implementation examples. Tooth profile 66 meshes in the toothing 18 in opening 16 of roller base 8. A latch groove is formed in the area of tooth profile 66, which corresponds in its shape to latch grooves 28 described in the preceding. This latch groove can mesh with the latch protrusions 26 in opening 16 of roller base 8. Opening 16 includes two latch protrusions 26 interspaced in the longitudinal direction of the roller. Depending on the extent to which driving member 58 is inserted into roller base 8, latch groove 68 will mesh with the first or the second latch protrusion 26. In the arrangement depicted in FIG. 8, latch groove 68 meshes with the first latch protrusion 16, i.e. the free of the latch protrusion turned toward roller base 8. Driving member 58 is not inserted very far on roller base 8 and presents a large free area away from roller base 8. Area 70 adjacent to the area with tooth profile 66 intended for the installation of the driving means has a smaller diameter than the area with tooth profile 66. The smaller diameter of area 70 is adapted to the diameter of the driving means to be employed. On its circumference, area 70 presents another tooth profile 72, which extends, starting from the area with tooth profile 66, over virtually the entire length of driving member 58. Tooth profile 72 is shaped in such a manner that it can mesh with a corresponding cogged belt. In the case of such an implementation example, driving member 58 is used without additional driving means, as depicted in FIG. 9. Here, a cogged belt can mesh with tooth profile 72 in area 70. The cogged belt is merely guided tangentially along tooth profile 72 or it contacts in a U-shape, depending on whether a tangential drive is used or a drive from roll to roll.

In the implementation example depicted in FIG. 8, two chain wheels 60 are inserted on tooth profile 72. These chain wheels correspond in their design essentially to the chain wheels depicted in FIG. 1. Chain wheels 60 merely present a smaller diameter. Chain wheels 60 have a through-hole in which the inner toothing is located, which meshes with toothing 72. This ensures a reliable transfer of force from chain wheels 60 to driving member 58. Area 70 with tooth profile 72 additionally contains two latch grooves 74, which extend along the circumference of driving member 58 and are interspaced in the longitudinal direction of the roll. These latch grooves 74 are designed such that they can mesh with the corresponding latch protrusions 76 on chain wheels 60, in order to fix chain wheels 60 in an axial direction on tooth profile 72. In contrast to driving member 22, driving member 58 presents no protrusion 24 on its free end, so that chain wheels 60 can be inserted from this side on tooth profile 72. After the insertion of chain wheels 60, the free end of driving member 58 is closed with a terminating cap 78. Terminating cap 78 includes a middle section 80, which extends from the free end to driving member 58. An offset 84 has been formed in through-hole 82 of driving member 58, which serves as a stop for the inserted middle part of terminating cap 78. Also, terminating cap 78 latch with a latch protrusion 86 extending along the circumference of middle section 80 in a corresponding latch groove 88 in through-hole 82 of driving member 58. This secures terminating cap 78 to driving member 58. Middle section 80 of terminating cap 78 has a through-hole, whose circumferential surfaces are shaped as sliding surfaces that slide on roller axis 12. Thus terminating cap 78 acts simultaneously as a plain bearing. However, terminating cap 78 can also be designed such that rather than a plain bearing an additional roller bearing and/or a shaft seal can be installed. Starting from middle section 80, terminating cap 78 presents a protrusion 92 that extends radially outward. Protrusion 92 extends on the free end radially over the outer circumference of tooth profile 72 and therefore also acts as an axial lock for the inserted chain wheels 60. Chain wheels 60 have such a width that they fit exactly between the area with tooth profile 66 and protrusion 92 of terminating cap 78.

FIG. 9 shows driving member 58 for use with a cogged belt. The implementation example depicted here essentially corresponds to the implementation example presented in FIG. 8. The implementation example depicted in FIG. 9 does not include the two chain wheels 60, since the cogged belt will run directly on tooth profile 72. Such a cogged belt is guides in an axial direction between protrusion 92 of terminating cap 78 and offset 94, formed at the transition between tooth profile 66 and tooth profile 72.

FIG. 10 shows the implementation example of driving member 58 for a tangential drive using a roller chain 62. Only one chain wheel 60 is needed on each driving roller for such a drive. Thus driving member 58 is deeper inserted in roller base 8, so that the free length of driving member 58, which extends from roller base 8, is reduced. In this deeper inserted state of driving member 58, latch groove 68 meshes with latch protrusion 26 that is located deeper inside roller base 8. The installed chain wheel 60 corresponds to the chain wheels depicted in FIG. 8. The free area of driving member 58, which extends away from roller base 8, has such a length that chain wheel 60 fits exactly between protrusion 92 of terminating cap 78 and the outer edge of roller base 8. Offset 94 cannot act as a supporting surface for chain wheel 60, so that chain wheel 60 is here merely retained in axial direction in latch groove 74 at the circumference of driving member 58, by protrusion 92 and/or roller base 8.

In FIGS. 8, 9 and 10 the arrangement of roller bearing 96 in the end of driving member 58 turned toward roller base 8 essentially corresponds to the arrangement of the corresponding roller bearing in FIGS. 4 to 6.

In all cutaway views of roller base 8 of driving member 22 and chain wheel 30, toothing 18, tooth profile 20 and tooth profile 56 are represented in a simplified form. Notwithstanding the fact that only two edges each of toothing 18 or toothing profile 20, 56 are depicted in the cutaway section, toothing 1 or tooth profile 20, 56 is formed along the entire circumference.

The following contains a description of two fundamental examples of the implementation according to the invention as depicted in FIGS. 11 to 16.

FIGS. 11 to 16 only depict the roller base of a driving roll according to the invention with installed drive wheels, since the remaining design of the driving roll, especially the design of the roller body corresponds to that described in FIGS. 1 to 10.

FIG. 11 shows a cutaway view of a roller base 102 of a driving roll according to the invention with an installed chain wheel 104. Roller base 102 is for example made of a circularly shaped synthetic material, which on its circumference is connected to a roller body not depicted here. In its interior, roller base 102 includes an opening 106 in which a roller bearing 108 is installed, which carries the driving roll on a roller axis. In addition, roller bearing 108 can be protected in the conventional manner, for example by a fastening ring, from axial displacement on roller axis 110, so that the driving roll is fixed in an axial direction on the roller axis 110 (not depicted here). Opening 106 extends up to the facing side 112 of roller base 102. The external circumference of opening 106, which preferably has an essentially circular shape, has a profile or a toothing 114, which meshes with a correspondingly shaped profile or toothing 116 on chain wheel 104. Toothing 116 is formed on a protrusion 118, which extends starting from a facing side of chain wheel 104. Together with protrusion 118, chain wheel 104 has been inserted in opening 106 at roller base 102, so that toothing 114 and 116 can engage each other. In addition, on the circumference of opening 106 on its end turned to the facing side 112 of roller base 102, a latch protrusion 120 has been formed. The circumference of protrusion 118 of chain wheel 104 presents a corresponding latch groove 122, which meshes with ring-shaped latch protrusion 120, when chain wheel 104 is inserted in opening 106 in roller base 102. This ensures a solid connection between chain wheel 104 and roller base 102, which prevents that chain wheel 104 can slide from opening 106. Furthermore, toothings 114 and 116 form such a solid connection between chain wheel 104 and roller base 102, that a reliable transfer of force from chain wheel 104 to roller base 102 is assured and therefore also onto a roller body. On its end turned away from roller base 102 or the facing side turned away from roller base 102, chain wheel 104 is provided with an opening 124. The shape of opening 124 essentially corresponds to that of opening 106 in roller base 102. This means specifically that it has the same dimensions. In addition, a toothing 126 has been provided in the circumference of opening 124, whose dimensions correspond to the dimensions of toothing 114 in roller base 102. The circumference of opening 124 also contains a latch protrusion 128 which corresponds to latch protrusion 120 in roller base 102, which extends ring-shaped along the circumference of opening 124 in the area of the end of chain wheel 104 turned away from roller base 102. In the implementation example depicted in FIG. 11, opening 124 includes a terminating device in the form of a end ring 130, which closes opening 124 and simultaneously acts as an additional bearing for chain wheel 104. Terminating ring 130 includes in its center an opening 132, whose diameter is adapted to the outer diameter of roller axis 110. The inner circumference of opening 132 is designed as a sliding surface, which together with the surface of roller axis 110 forms a plain bearing for chain wheel 104. In addition, chain wheel 104 also includes an opening 134 in the center of protrusion 118, whose diameter is also adapted to the outer diameter of roller axis 110 and whose circumference is also designed as a sliding surface so that it can rotate freely on roller axis 110. Thus, opening 134 also acts as a plain bearing with which chain wheel 104 is carried on roller axis 110, so that no undesired lateral forces are transferred from chain wheel 104 to roller base 102 and thus in the roller body. Both roller base 102 as well as chain wheel 104 and terminating ring 130 can be produced cost-effectively from synthetic material, for example by means of injection molding, but can also be made of metal in the event that higher forces occur.

The design of roller base 102 and terminating ring 130 depicted here also permit that the roller base is used on a roller end on which no drive wheels are installed. In this case, terminating ring 130 is inserted directly into opening 106 in roller base 102, which is possible because of the identical shape of opening 106 and 124. Thus, similar to the earlier described method, a roller bearing 108 can be installed in roller base 102, which is then fixed by terminating ring 130. Thus, the roller base 102 as well as terminating ring 130 can be used universally, which reduces the required number of individual parts.

FIG. 12 presents a cutaway view through a roller base 102 with installed chain wheels 104, 136 according to the invention. Roller base 102 with the first installed chain wheel 104 corresponds to the design described with the help of FIG. 11. Rather than a terminating ring 130, the implementation example shown in FIG. 12 depicts a second chain wheel 136 installed in opening 124 of the first chain wheel 104. Chain wheel 136 is designed identically to chain wheel 104. Since opening 124, as explained with the help of FIG. 11, is designed identically to opening 106 in roller base 102, chain wheel 136 can be inserted with its protrusion 138 in opening 124 of the first chain wheel 104. Chain wheel 136 meshes with a corresponding toothing 140 and a latch groove 142 in toothing 126 or latch protrusion 128 in opening 124 of chain wheel 104. If two chain wheels 104, 136 are required, these can be simply inserted in sequence and then be inserted into roller base 102, without this requiring additional mounting or adaptation steps. No other special components are required since both chain wheels 104, 136 are identical. In the implementation example depicted here, terminating ring 130 is inserted in opening 144 of the second chain wheel 136, which is designed identical to opening 124. The bearing of chain wheels 104, 136 essentially corresponds to a bearing using plain bearing, as explained with the help of FIG. 11. In addition to the sliding surfaces of terminating ring 130 and chain wheel 104, there is another sliding surface of chain wheel 136 at the opening of protrusion 138, which correspond to opening 134 explained with the help of FIG. 11, since the chain wheels 104 and 136 have an identical design.

FIG. 13 depicts a cutaway view through another implementation example of the invention, which essentially corresponds to the implementation example explained with the help of FIG. 11. Roller base 102, depicted in FIG. 13, as well as chain wheel 104, terminating ring 130, roller axis 110 and roller bearing 108 correspond to the components explained with the help of FIG. 11. Additionally, the implementation form depicted in FIG. 13 presents a second roller bearing 146 in the opening 124 of chain wheel 104. Ball bearing 146 allows chain wheel 104 to rotate on roller axis 110. In this manner, higher forces, especially radial forces from chain wheel 104 can be transferred to roller axis 110, as is also possible with the plain bearing explained with the help of FIG. 11. The plain bearings are also present in the implementation form depicted in FIG. 13, since chain wheel 104 and terminating ring 130 are identical to the parts shown in FIG. 11. In addition terminating ring 130 is used to fix ball bearing 146 axially in opening 124. Ball bearing 146 is retained between an offset 148 established in opening 124 and terminating ring 130. This design of chain wheel 104 provides an even more flexible use of identical components, since an additional roller bearing or ball bearing 146 can simply be installed on the chain wheel 104 without additional changes to the components.

FIG. 14 shows the implementation form explained on the basis of FIG. 12, where an additional roller or ball bearing 150 is installed in opening 144 of chain wheel 136. Considering that chain wheels 104 and 136, as explained with the help of FIG. 12, are identical, the arrangement of ball bearing 150 in chain wheel 136 corresponds exactly to the arrangement of ball bearing 146 in chain wheel 104, as described with the help of FIG. 13. Thus, even when two chain wheels 104, 136 are used, an additional roller bearing, here in the form of ball bearing 150, can simply be installed without great effort or without requiring additional components, so that greater forces can reliably be transferred from chain wheels 104, 136 to roller axis 110. The overall remaining design of the arrangement depicted in FIG. 14 corresponds to the implementation form described with the help of FIG. 12, specifically chain wheels 104, 136 are identical components.

FIG. 15 shows an implementation example of the driving roll according to the invention for use with a drive using a cogged belt. Similar to the preceding figures, FIG. 15 merely depicts roller base 102 together with the installed drive wheels. The roller body, which is connected to roller base 102, is not depicted. Roller base 102 as well as the installed ball bearing 108, which is used to retain the driving roller on roller axis 110, are identical to the components described with the help of FIG. 11 to FIG. 14. Contrary to the earlier described implementation examples, FIG. 15 depicts two drive wheels on the roller base in the form of toothed wheels 152 and 154. Toothed wheels 152 and 154 are identical in form and present on their outer circumferences a toothing, which can mesh with the corresponding cogged belt to drive the driving roll. On their face side, toothed wheels 152, 154 each present a protrusion 156 or 158, which correspond to the design of protrusions 118 and 138, which have been explained with the help of FIGS. 11 and 12. Toothed wheel 152 with its protrusion 156 is installed in opening 106 in roller base 102, whereby protrusion 156 meshes with an appropriate toothing in toothing 114 in opening 106, as was explained with the help of FIG. 11. Protrusion 156 also presents a latch groove, which meshes with the latch protrusion 120 in opening 106. Overall, the design of toothed wheels 152 and 154 merely differs from chain wheels 104 and 136 in terms of their outer circumference. The interior design, i.e. especially the construction of protrusions 156, 158 and openings 160, 152 is identical to the interior design of protrusions 118, 138 and opening 124 and 144 of chain wheels 104 and 136, as depicted in FIGS. 11 to 14. Thus the second toothed wheel 154 is simply inserted in opening 160 of the first toothed wheel 152, which has been inserted in opening 106 of roller base 102, where it meshes with a corresponding toothing and a corresponding latch protrusion. Additionally, a spacer 164 is placed or clamped between the two toothed wheels 152, 154, which separates the running surfaces for the cogged belts on toothed wheels 152 and 154, in order to avoid contact between the belts during operation. Terminating ring 130 is installed in opening 162 of toothed wheel 154, as was explained earlier with the help of the previous Figures. Terminating ring 130 presents a ring-shaped protrusion 166, which extends radially over the outer circumferential surface of toothed wheel 154 and acts as a stop ring for the cogged belt. Thus, two cogged belts, which can run on toothed wheels 152 and 154, can be guided between protrusion 166 and spacer 164 or spaces 164 and facing side 112 of roller base 102. The bearing of toothed wheels 152 and 154 on ball bearing 108 corresponds to the plain bearing of chain wheels 104 and 136 described with the help of FIG. 12, since the interior design of toothed wheels 152, 154 is identical to that of chain wheels 104, 136.

FIG. 16 presents a cutaway view through a variant of the implementation form described with the help of FIG. 15. Roller base 102 and ball bearing 108, the two toothed wheels 152, 154 as well as terminating ring 130 correspond to the components depicted in FIG. 15. FIG. 16 in addition presents a roller bearing, here in the form of a ball bearing 168, installed in opening 162 of toothed wheel 154. The arrangement of ball bearing 168 is identical to the arrangement of ball bearing 150 in opening 144 of chain wheel 136, as depicted in FIG. 14. Again, ball bearing 168 is retained between a terminating ring 130 and a stop or shoulder 170 in opening 162. Ball bearing 168 provides for a high carrying capacity of the bearing of toothed wheels 152, 154 on roller axis 110 compared to a plain bearing alone, as was described with the help of FIG. 12.

As shown by the examples described in FIGS. 11 to 16, in the case of the driving roll according to the invention, which presents a modular construction, a multiple number of different driving types can be implemented without this requiring at the same time a multiple number of different specially adapted components. For example, depending on the needs, different toothed or chain wheels can be inserted on roller base 102, and depending on the needs, additional toothed or chain wheels can be added to a toothed chain wheel that has been installed on roller base 102. Additionally, it is also easy to employ chain or toothed wheels with different diameters, which can be easily combined.

REFERENCE LIST

2 Driving roll
4 Roller body
6,8 Roller base
10 Bearing
12 Roller axis
14 End on the drive side
16 Opening
18 Toothing
20 Tooth profile
22 Driving member
24 Protrusion
26 Latch protrusion
28 Latch groove
30 Chain wheels
32 Inner toothing
34 Ball bearing
36 Offsets
38 Latch protrusions
40 Sealing element
42 Through-hole
44 Protrusions
46 Cavities
48 Plain bearing
50 Spacer
51 Latch protrusion
52 Teeth
54 Through-hole
56 Tooth profile
58 Driving member
60 Chain wheels
62 Roller chain
64 End of the driving member turned toward the roller base
66 Tooth profile
68 Latch groove
70 Area for installation of the driving means
72 Tooth profile
74 Latch grooves
76 Latch protrusions
78 Terminating cap
80 Middle section
82 Through-hole
84 Offset
86 Latch protrusion
88 Latch groove
90 Through-hole
92 Protrusion
94 Offset
96 Roller bearing
102 Roller base
104 Chain wheel
106 Opening
108 Roller bearing
110 Roller axis
112 Facing side
114 Toothing
116 Toothing
118 Protrusion
120 Latch protrusion
122 Latch groove
124 Opening
126 Toothing
128 Latch protrusion
130 Terminating ring
132 Opening 134 Opening
136 Chain wheel
138 Protrusion
140 Toothing
142 Latch groove
144 Opening
146 Ball bearing
148 Shoulder
150 Ball bearing
152 Toothed wheel
154 Toothed wheel
156 Protrusion
158 Protrusion
160 Opening
162 Opening
164 Spacer
166 Protrusion
168 Ball bearing
170 Shoulder

What is claimed is:

1. A drive assembly for a conveyor roller comprising:
   a) a plurality of modular drive wheels; and
   b) a coupling device insertable into an end of said conveyor roller and securable at different positions for mounting a variable number of the modular drive wheels to the conveyor roller.

2. The drive assembly of claim 1 wherein said coupling device comprises a roller base fastened to one end of said conveyor roller, the roller base having an opening that extends in the longitudinal direction of the conveyor roller, and a driving member insertable into the opening in the roller base.

3. The drive assembly according to claim 2 wherein the driving member is insertable into the opening in at least two insertion positions in which the driving member is inserted at different distances into the roller base.

4. The drive assembly of claim 2 wherein said drive assembly further includes latching means for securing the drive member to the roller base in any one of at least two insertion positions.

5. The drive assembly of claim 2 wherein the opening of the roller base has a tooth profile which engages with a corresponding tooth profile on the outer surface of the driving member.

6. The drive assembly of claim 5 in which the tooth profile on the outer surface of the driving member is shaped to correspond to the profile of a cog belt.

7. The drive assembly of claim 2 in which at least one drive wheel comprises a chain wheel.

8. The drive assembly of claim 7 in which the chain wheel engages the tooth profile on the outer surface of the drive member.

9. The drive assembly of claim 2 in which the driving member is rotatably mounted on a roller axis extending in the longitudinal direction of the roller.

10. A drive assembly for a conveyor roller comprising:
    a) one or more modular drive wheels; and
    b) coupling means for coupling a variable number of the drive wheels to the conveyor roller, the coupling means being securable at a variety of longitudinal lengths extending outward from the conveyor roller to accommodate the one or more modular drive wheels.

11. The drive assembly according to claim 10 wherein said coupling means comprises a roller base fixed to an end of said conveyor roller and a connecting device on each drive wheel, the connecting device of a first drive wheel adapted to engage the roller base, and the connecting device of each subsequent drive wheel adapted to engage the preceding drive wheel.

12. The drive assembly according to claim 11 wherein said connecting devices comprise a protrusion formed on a first face of said drive wheels.

13. The drive assembly according to claim 12 wherein said coupling means further comprises a series of openings formed in said roller base and a second face of said drive wheels said openings adapted to receive a corresponding shaped protrusion of a drive wheel.

14. The drive assembly according to claim 10 wherein said coupling means comprises a roller base fastened to one end of said conveyor roller and a driving member engageable with the roller base and the drive wheels.

15. The drive assembly according to claim 13 further including latching means to fasten the connection devices of the modular drive wheels with the openings in the roller base and the drive wheels.

16. The drive assembly according to claim 15 in which the latching means comprises latch grooves and corresponding latch protrusions formed on the holding devices and connection devices and openings.

17. The drive assembly according to claim 10 in which at least one drive wheel is a chain wheel.

18. The drive assembly according to claim 10 in which at least one drive wheel includes a plurality of grooves disposed about its circumference for engagement with a cogged belt.

19. The drive assembly according to claim 10 in which at least one drive wheel is installed on a roller access which carries the conveyor roller.

20. The drive assembly according to claim 10 in which at least one drive wheel provides a seat for holding a bearing.

21. The drive assembly according to claim 10 in which at least one drive wheel includes a bearing surface which has a sliding contact with a roller access.

* * * * *